United States Patent

[11] 3,571,808

[72] Inventors Isamu Washizuka
Osaka;
Satoshi Teramura, Nara-shi; Hitoshi
Hanahara, Yamatokoriyamia-shi, Japan
[21] Appl. No. 781,849
[22] Filed Dec. 6, 1968
[45] Patented Feb. 23, 1971
[73] Assignee Sharp Kabushiki Kaisha
Osaka, Japan
[32] Priority Dec. 12, 1967
[33] Japan
[31] 42/79702

[54] DECIMAL POINT PROCESSING APPARATUS
6 Claims, 20 Drawing Figs.

[52] U.S. Cl. .......... 340/172.5
[51] Int. Cl. .......... G11b 13/00
[50] Field of Search .......... 340/172.5; 235/157, 176

[56] References Cited

UNITED STATES PATENTS

| | | | |
|---|---|---|---|
| 3,274,556 | 9/1966 | Paul et al. | 340/172.5 |
| 3,350,692 | 10/1967 | Cagle et al. | 340/172.5 |
| 3,374,468 | 3/1968 | Muir III | 340/172.5 |
| 3,436,737 | 4/1969 | Iverson et al. | 340/172.5 |

*Primary Examiner*—Raulfe B. Zache
*Attorney*—Eugene E. Geoffrey, Jr.

ABSTRACT: A computer having registers in which a plurality of memory cells are connected in cascade in correspondence with the desired number of bits, only one of said memory cells is arranged to have an operational state different from those of all of the other memory cells and the bit location of said memory cell having the operational state (memory state) different from the others is caused to correspond to a numerical value to be stored, means of shifting said bit location of said memory cell having the operational state different from the others to another bit location, and shift control means for determining said bit location to which said bit location of said memory cell having the operational state different from the others is to be shifted in correspondence with a numerical value to be arithmetically operated as one operand with respect to said numerical value already stored in the register.

INVENTORS
ISAMU WASHIZUKA
HITOSHI HANAHARA
SATOSHI TERAMURA
BY
Eugene E. Geoffrey
ATTORNEY

INVENTORS
ISAMU WASHIZUKA
HITOSHI HANAHARA
SATOSHI TERAMURA
BY
ATTORNEY

INVENTORS
ISAMU WASHIZUKA
HITOSHI HANAHARA
SATOSHI TERAMURA
ATTORNEY

INVENTORS
ISAMU WASHIZUKA
HITOSHI HANAHARA
SATOSHI TERAMURA
BY
ATTORNEY

INVENTORS
ISAMU WASHIZUKA
HITOSHI HANAHARA
SATOSHI TERAMURA

BY [illegible]
ATTORNEY

INVENTORS
ISAMU WASHIZUKA
HITOSHI HANAHARA
SATOSHI TERAMURA
BY
ATTORNEY

INVENTORS
ISAMU WASHIZUKA
HITOSHI HANAHARA
SATOSHI TERAMURA
BY
ATTORNEY

DECIMAL POINT PROCESSING APPARATUS

This invention relates to an operation device, especially to a relatively small scale operation device suitable for an electronic computer of table type.

In a table-type electronic computer or like computing device, it is also necessary to perform small scale arithmetic processings such as decimal point processing, not to speak of numerical processings. For example, addition of the numbers of digits above decimal point of concerning operands is required in multiplication and subtraction of said numbers is required in division. In order to execute such decimal point processings, an adder and its control device are needed as in the case of normal numerical processings.

In order to demonstrate a feature of small size and little weight, however, it is necessary to avoid the addition of a large scale devices for decimal point processing in multiplication and division and thus prevent the device becoming bulky. Though it can be considered to use commonly adders and their cooperating devices used for numerical processings for this purpose, a number of logic gates must be added to said adders and cooperating devices and it is considerably troublesome to control them.

Recently, circuit integration technique has been remarkably developed also in the field of electronic table computer and other digital equipments and it tends to integrate all circuit elements in each block in a single semiconductor substrate. In accordance with such tendency, it is considered, for example, to integrate the numerical processing section and decimal point processing section and their cooperating sections as a single block. As described in the above, in the case of using the adders in the numerical processing section for the decimal point processing purpose, interconnections between the blocks are required and the number of terminals of the integrated semiconductor device will increase therefore. This fact (increase of the number of terminals) is undesirable in view of geometrical limitation of the container.

If, from these circumstances, the decimal point processing section is provided with an adder and its cooperating device similar to those in the numerical processing section, however, an operation device of same scale as in the numerical processing section will be constituted in the decimal point processing section of which only a small scale operation performance is required, and it is undesirable.

Therefore, an object of this invention is to propose an improved operation device in which the number of additional devices can be remarkably lessened in comparison with conventionally known operation devices.

Another object of this invention is to propose an operation device based upon a novel principle fully different from that of the conventionally known operation devices.

A further object of this invention is to propose an operation device suitable especially for integration of the whole circuit and having few outer terminals when assembled in a single integrated circuit.

Another object of this invention is to propose an operation device suitable for an electronic computer of table type and computing devices and, especially, for small scale arithmetic operations such as decimal point processing.

In brief, according to this invention, provided is an operation device including registers in which a plurality of memory cells are connected in cascade in correspondence with the desired number of bits, only one of said memory cells is arranged to have an operational state different from those of all of the other memory cells and the bit location of said memory cell having the operational state (memory state) different from the others is caused to correspond to a numerical value to be stored, means of shifting said bit location of said memory cell having the operational state different from the others to another bit location, and shift control means for determining said bit location to which said bit location of said memory cell having operational state different from the others is to be shifted in correspondence with a numerical value to be arithmetically operated as one operand with respect to said numerical value already stored in the register.

Other objects and feature of this invention will be best understood if the following description of an embodiment of this invention is read with reference to the accompanying drawings. The preferred embodiment relates to an electronic computer of table type.

Figure 1:
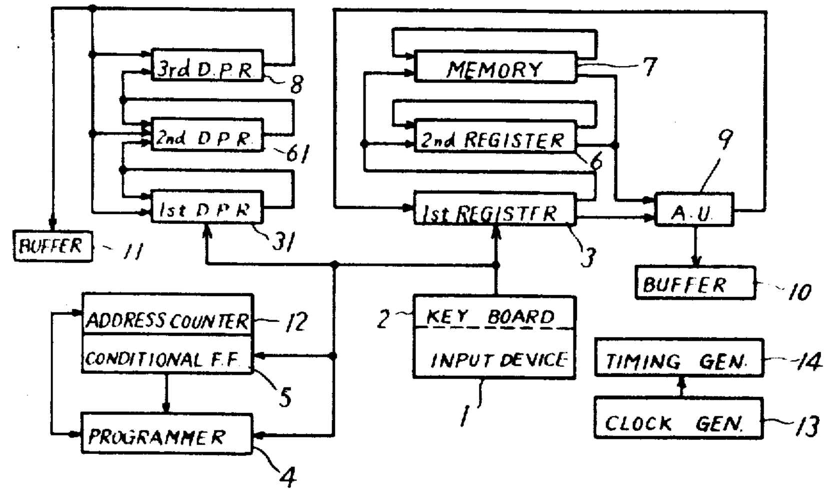
FIG. 1 is a block diagram representing a structure of conventional operation device.
Figure 2:
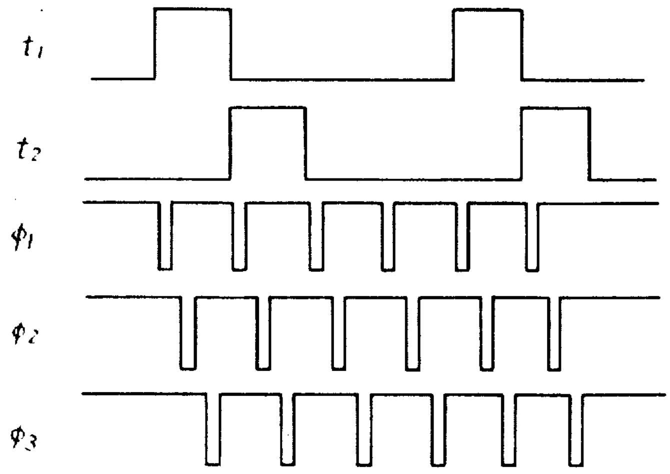
FIG. 2 is a time chart representing a relation between a clock pulse and a bit timing pulse in one embodiment of operation device according to this invention.
Figure 3:
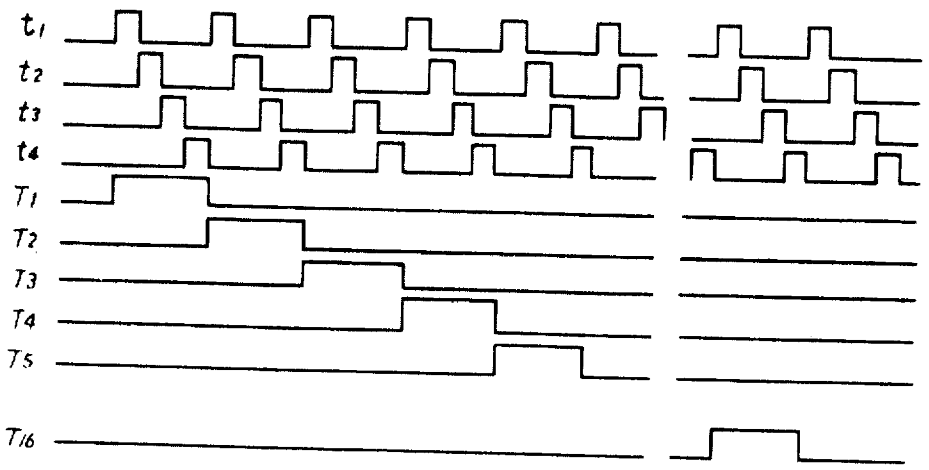
FIG 3 is a time chart representing a relation between the bit timing pulse and digit timing pulse.
Figure 4:
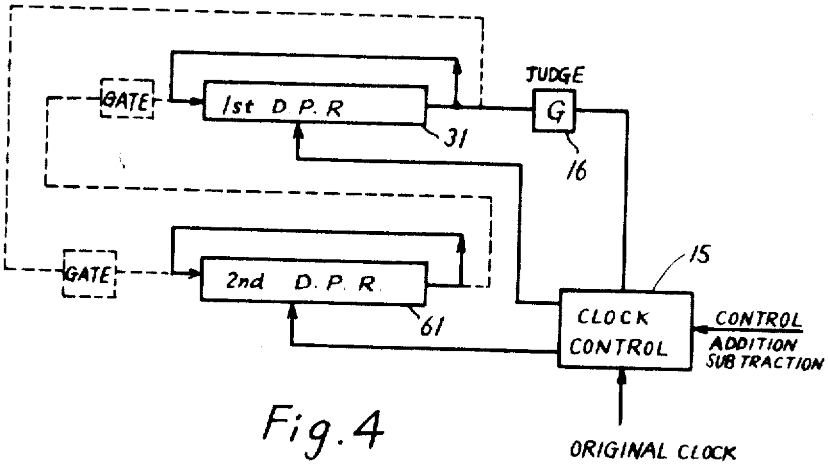
FIG. 4 is a block diagram illustrative of a structure of main portion of the operation device according to this invention.
Figures 1, 5:
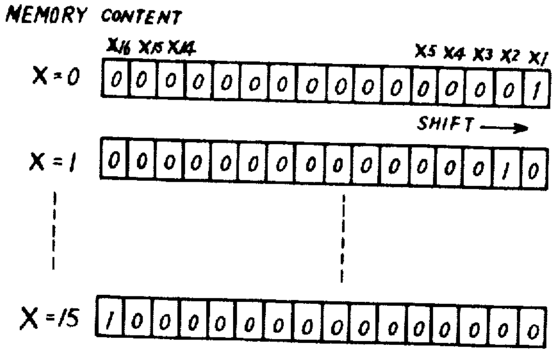
Figures 2, 5:
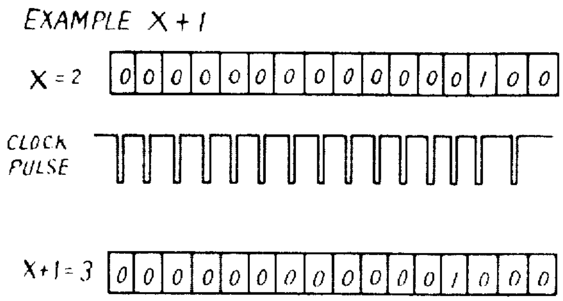
Figures 3, 5:
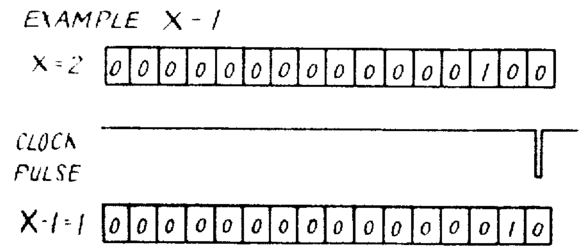
Figures 4, 5:
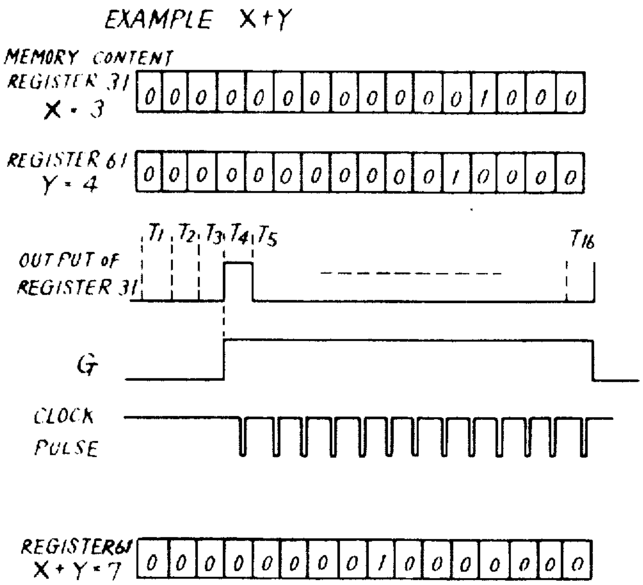
Figure 5:
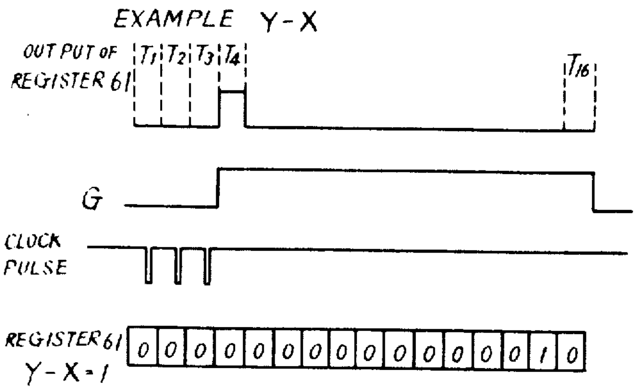
Figure 6:
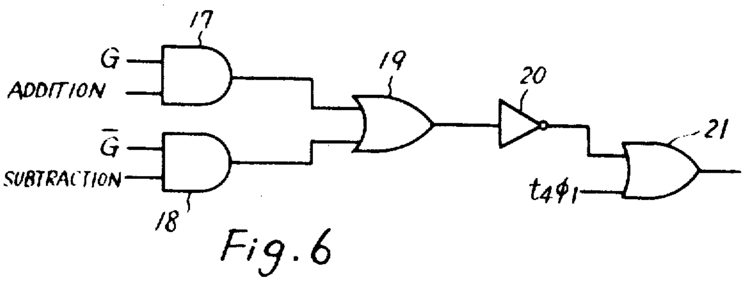
Figures 1, 7:
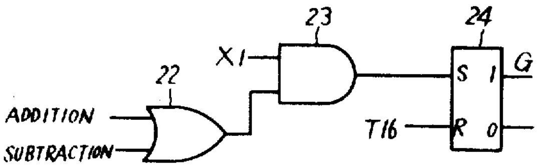
Figures 2, 7:
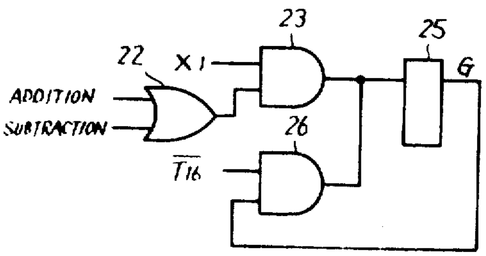
Figure 8:
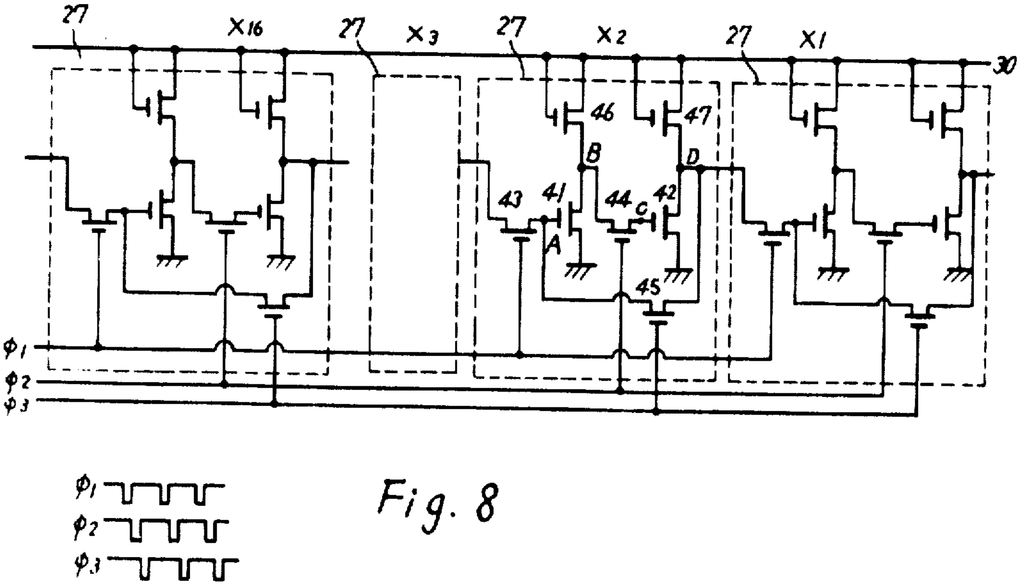
Figure 9:
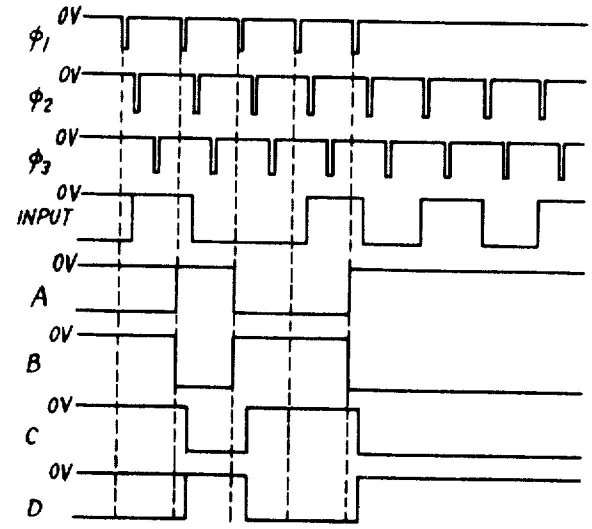
Figures 1, 10:
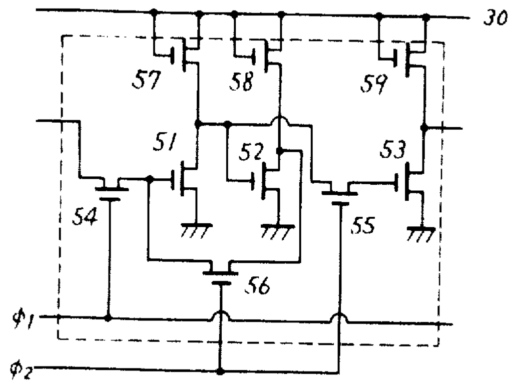
Figures 2, 10:
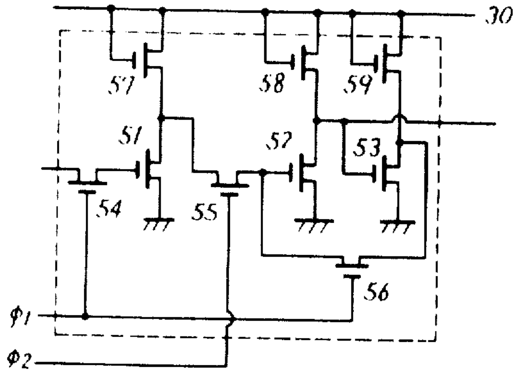
Figures 3, 10:
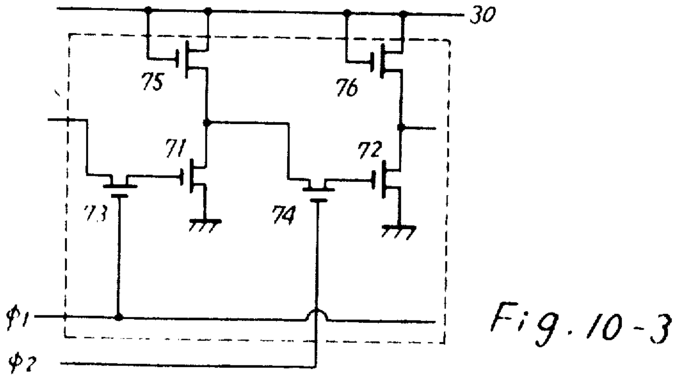
Figure 11:
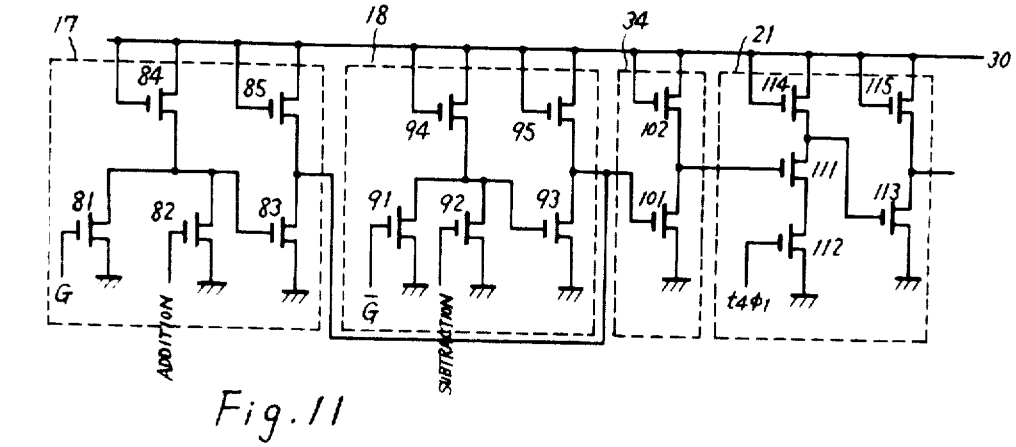
Figure 12:
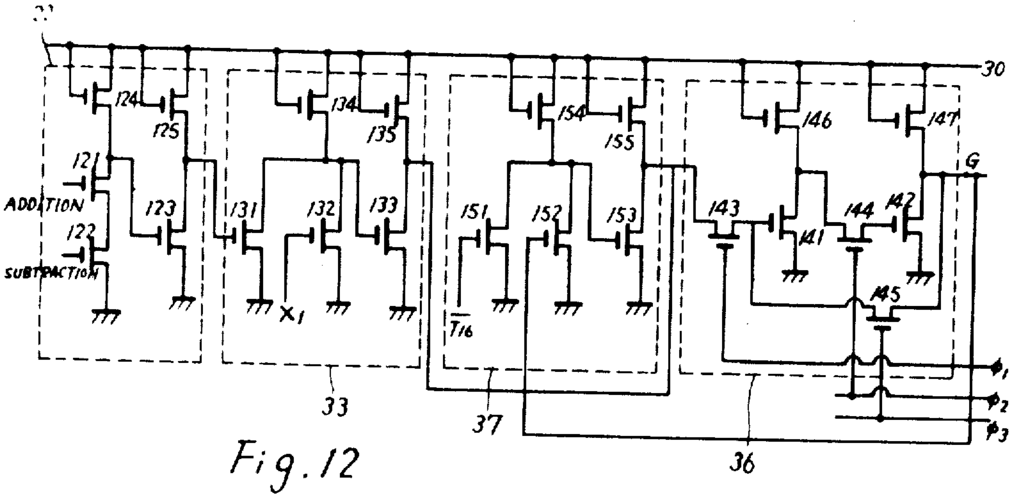
Figure 13:
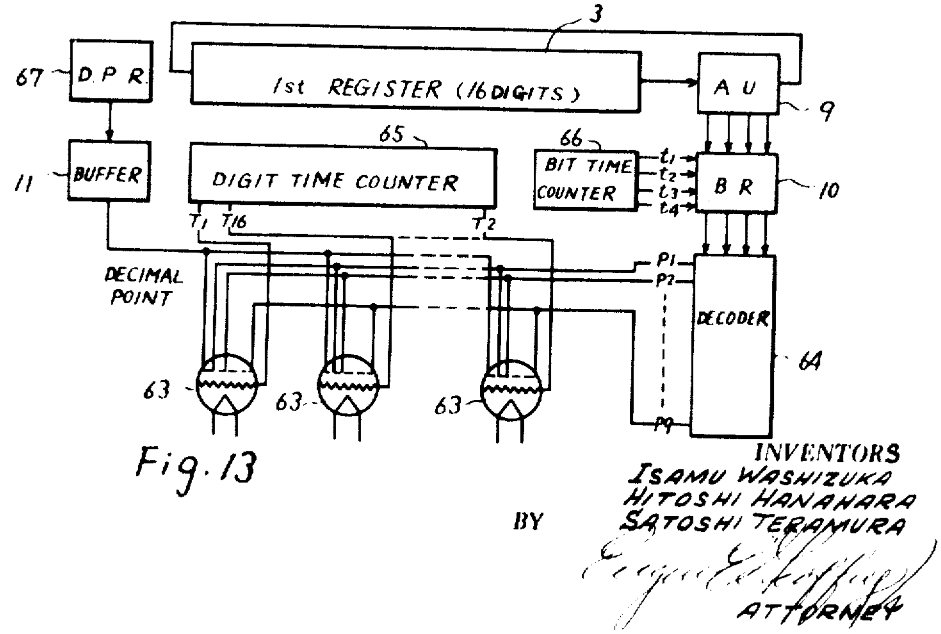

FIGS. 5—1 through 5–5 are diagrams for an aid of explanation of operation of the operation device shown in FIG. 4;

FIG. 6 is a diagram representing a logic constitution of the clock pulse control device 15 in FIG. 4;

FIG. 7–1 and 7—2 are diagrams representing a logic constitution of the judging device 16 in FIG. 4;

FIG. 8 is a diagram representing a practical circuit embodiment of the decimal point registers 31 and 61 in FIG. 4;

FIG. 9 is a diagram for an aid of explanation of operation of the circuit of FIG. 8;

FIG. 10–1 through 10–3 are diagrams representing another circuit embodiment of the decimal point registers 31 and 61 in FIG. 4;

FIG. 11 is a diagram representing a practical circuit configuration of the clock pulse control device 15 in FIG. 4;

FIG. 12 is a diagram representing a circuit embodiment of the judging device 16 in FIG. 4; and FIG. 13 is a block diagram representing a structure of an indication section of the operation device according to this invention.

Referring to FIG. 1 representing a structure of conventional table-type electronic computer, two kinds of inputs for controlling the whole system, that is, an information relating to numerical values and an instruction relating to operation processing, are introduced in the computer by means of an input device 1. Said input device 1 includes a 10-key-type keyboard 2 provided with numeral keys of 0 through 9, a decimal point key and operational function keys such as x (multiplication), (division) and = (equal), and can introduce the signals relating to numerical values and operation processing through desired ones of the keys pushed by an operator. The numerical processing section of the input device 1 is directly coupled to a first register 3 and a first decimal point register 31 and a numerical information and a decimal point information are respectively written in said first register 3 and said first decimal point register 31. The operation indication section of the input device 1 is directly coupled to a programmer 4 and a conditional flip-flop 5. In the case of write-in operation of two operands, the first operand is written in the first register 3 and then transferred to the second register 6 and the second operand is thereafter introduced in the vacant first register 3. In connection therewith, the decimal point portions of said two operands are similarly written in the first decimal point register 31 and the second decimal point register 61. A memory 7 and a third decimal point register 8 cooperating therewith are provided for utilization in multiplications by a constant number or addition and subtraction of products.

In the following description, it is assumed for explanation purpose that the numerical values processed in this operation system are of binary coded decimal notation (four bits in each digit) and the maximum capacities of the registers 3 and 6 and the memory 7 are 16 digits (4×16 bits). The maximum capacities of the decimal point registers 31 and 61 are 16 bits.

The output from the first register 3 and the output from the second register 6 or the memory 7 are both introduced in an arithmetic unit 9 and a desired operation is executed therein. Said arithmetic unit includes therein a full adder having additional capability of pure binary numbers, a carry memory and a decimal decoding correction device. Multiplication and division are executed using methods or repeated addition and repeated subtraction respectively and operations of four fundamental rules of arithmetics can be done. It should be noted in this case that the outputs of the decimal point registers 31 and 61 are not introduced in the arithmetic unit 9. A buffer register 10 is required for temporarily storing a content to be indicated and obtaining a decimal output for driving an indication tube in the case of indicating outwards a result of operation or a content of register by use of the indication tube such as gas-filled glow discharge tube. Similarly, a second buffer register 11 is provided for temporarily storing the decimal point information in the case of external indication.

The programmer 4 generates microorders necessary for execution of various operations in a diode microorders system. The microorders are introduced in the inputs of logic gates provided between various sections of the device to control flows of numerical information. In operation of said programmer 4, when, for example, several or several 10 input address lines are provided for multiplication and one of said address lines is selected, a plurality of output lines coupled thereto through diodes are driven to generate several kinds of microorders to control information transfer between related devices.

An address counter 12 is provided for sequentially designating the program address lines with advance of operation processes. The conditional flip-flop 5 is provided for judging properly the internal conditions of the various devices during advance of operation processes an selecting the program address lines based upon its judgment output to generate microorders corresponding to the cases, thereby intending a high efficiency of operation. Some other flip-flops are provided for judgment. A clock pulse generator 13 is provided for generating clock pulses used for a standard of synchronous control of the various devices. A timing signal generator 14 variously modifies said clock pulses to produce bit timing signals and digit timing signals. A relation between the clock pulse generator 13 and the decimal point processing section will be hereinafter described in detail.

In the embodiment herein described, the clock pulse generator 13 is provided with three oscillators and generates three kinds of clock pulses ., $\Phi_2$, and $\Phi_3$, as shown in FIG. 2, having different phases which are to be introduced in the various registers. Said clock pulses transfer and circulate information stored in the memory cells of the registers 3 and 6 and the decimal point registers 31 and 61 through said registers. The digit timing signals $T_1$, $T_2$,. . . $T_16$ in FIG. 3 represent a time scale indicative of weights of digits in the case of viewing the informations serially circulating through the registers at the output terminal of said registers and designate the boundaries of each word time (16 digits in each word). The bit timing signals $t_1$, $t_2$, $t_3$ and $t_4$ are indicative of weights 8, 4, 2, and 1 respectively, in each digit. As shown in FIGS. 2 and 3, the duration of one digit timing signal includes four bit timing signals and the duration of one bit time signal includes three clock pulses $\Phi_1$, $\Phi_2$, and $\Phi_3$. However, these three kinds of clock pulses are not always required according to circuit configuration of the memory cell.

The relation between the decimal point registers 31 and 61 and the clock pulse generator 13, which is the subject matter of this invention, will be described in detail as the under.

FIG. 4 represents a scheme of an operation device according to this invention. First and second decimal point registers 31 and 61 are respectively composed of 16 memory cells (flip-flops) corresponding to 16 bits and connected in cascade. Since the structural elements of each cell cannot store informations semipermanently and their storable time is limited, they circulate and keep the information as transferring successively to the next structural elements and may be presented as dynamic registers. However, the both decimal point registers operate so that only one of the memory cells is in an operational state (memory state) different from those of all of the other memory cells. Of course, the bit position of said memory cell in the different operational state is made to correspond to a numerical value to be stored. The clock pulses $\Phi_1$, $\Phi_2$ and $\Phi_3$ can shift the content of said memory cell in the different operational state to another memory cell corresponding to another bit position. If a set of clock pulses $\Phi_1$, $\Phi_2$, and $\Phi_3$ included in one bit time are introduced in a register, the bit position corresponding to said memory cell in the operational state different from the others becomes to be shifted to the next by one bit. Under the circumstances that the bit position of said memory cell of the different operational state is made to correspond to the numerical value to be stored, therefore, the above-mentioned introduction of the clock pulses results in a change of the numerical value stored in the register. Accordingly, it is also possible to impart an operational function without use of conventional adders if the relation between the numerical value stored in the register and the clock pulses is appropriately utilized. The foundation of this invention is at this point. In practice, however, it is a problem how the clock pulses are controlled to execute addition or subtraction of the numerical value as an operand with respect to the numerical value already stored in the register.

A clock pulse control device 15 controls the clock pulses $\Phi_1$, $\Phi_2$, and $\Phi_3$ to be introduced in the registers 31 and 61 as interrupting them for a specific time interval determined in accordance with a sort of addition and subtraction and the operand. Therefore, said clock pulse control device 15 is applied with the original clock pulses from the clock pulse generator 13, an operation instruction such as an addition or subtraction command and a signal relating to the operand. A judging device 16 is provided for deriving a judgement output which designates how the numerical value stored in the first decimal point register 31 is added to or subtracted from the numerical value stored in the second decimal point register 61. In practice, it judges that in what kind of operational state the memory cell corresponding to the least significant bit position in the first decimal point register is.

Now, description will be made about a simple example of calculation with reference to FIG. 5. All of the memory cells in the register 31 respectively take either of only two states, that is, binary 0 or 1. For example, it is assumed that the above-mentioned operational state different from the others is binary 1, the bit position of the memory cell at the right-hand end of the register has the least significant bit $x_1$ and the bit position of the memory cell at the left-hand end of said register has the most significant bit $x_16$. Moreover, it is assumed that, if the set of clock pulses $\Phi_1$, $\Phi_2$, and $\Phi_3$ are introduced in the register, the content of the memory cell storing binary 1 is shifted to a less significant bit position.

Referring to FIG. 5–1, it is defined that; when only the memory cell corresponding to the lest significant bit $x_1$ stores binary 1, the register 31 stores decimal 0; when only the memory cell corresponding to the second bit $x_2$ stores binary 1, said register 31 stores decimal 1; in the similar manner, the successive decimal numerals stored in the register is made to correspond to the successive bit positions storing binary 1; and, at last, when only the memory cell corresponding to the most significant bit $x_16$ stores binary 1, said register 31 stores decimal 15.

Now referring to FIG. 5–2, consideration is made about the case of addition $x+1$, where $x$ generally indicates a decimal numeral stored in the register 31 and, in the present case, decimal 2 is stored in said register and $x=2$. According to the connection with the registers in the numerical processing section, practical design is so arranged that only one set of clock pulses $\Phi_1$, $\Phi_2$ and $\Phi_3$ are introduced in the register 31 during only the duration of the bit timing pulse $t_4$. Therefore, the bit position in the operational state different from the others in shifted by one bit in response to the introduction of the set of clock pulses at each lapse of the digit timing pulse. Moreover, the operation is executed by controlling not all but one of the set of clock pulses $\Phi_1$, $\Phi_2$ and $\Phi_3$. Only a clock pulse controlled by the control device 15 is shown in the drawings. If a binary information 1 is intended to be merely circulated at a period of one word-length time, only one clock pulse is enough to be introduced during each digit time. However, in the case of such addition as $x+1$, it is necessary to introduce 15 clock pulses in the register 31 during one word-length time and to interrupt the introduction of clock pulse during only one digit time. Thus, the content of the memory cell having stored binary 1 is shifted to the fourth bit position and this results in storage of decimal 3 in the register 31 and in completion of addition of one.

FIG. 5-3 is illustrative of the case of subtraction, $x-1$, where $X=2$. By introducing the clock pulses in the register 31 during only one digit time, the content of the memory cell having stored binary 1 is shifted to the bit position corresponding to the second bit $x_2$ and this results in completion of the subtraction.

FIG. 5-4 is illustrative of the case of addition, $x+Y$, of informations stored in the both registers 31 and 61, where $X$ indicates a decimal numeral stored in the register 31 and $Y$ indicates that stored in the register 61 and, in the present example, $X=3$ and $Y=4$. It is particularly necessary in this case to make a connection with the output of the judging device 16. The judging device 16 judges whether or not the memory cell corresponding to the least significant bit in the register 31 stores binary 1 and, if the judgment is YES, produces a judgment output G continuously from the beginning of the concerning digit time to the termination of the word-length time. In the above-mentioned case where decimal 3 is stored in the register 31 and decimal 4 is stored in the register 61, an addition command is applied to the clock pulse control device 15. Binary 1 appears from the lowermost end of the register 31 only during the time interval wherein the digit timing pulse $T_4$ exists and is judged by the judging device 16 and, in the result, the judgment output G is derived during the time interval from the digit timing pulse $T_4$ to the digit timing pulse $T_{16}$. If an addition command is generated and the clock pulses are arranged to be introduced in the register 61 only during the duration of the judgment output G, thirteen clock pulses in total are introduced in said register 61 during one word-length time. When such number of clock pulses are introduced, the content of the memory cell storing binary 1 is shifted toward the least significant bit position, returned to the most significant bit position, and in the result, reached the eighth bit position corresponding to the bit $x_8$. This means completion of addition $X+Y=7$.

On the contrary, FIG. 5-5 is illustrative of the case of subtraction, $Y-X$, where $Y=4$ and $X=3$. If a subtraction command is generated and the clock pulses are arranged to be introduced in the register 61 only during the time interval wherein the judgment output $\overline{G}$ does not exist, three clock pulses in total are introduced in the register 61 during one word-length time and, in the result, the content of the memory cell storing binary 1 is shifted to the bit position corresponding to the second bit $x_2$. That is to say, desired operational function can be obtained if the clock pulses are arranged to be introduced only during the time interval wherein the judgment output G exists in the case of addition and the output G does not exist in the case of subtraction.

FIG. 6 represents a logic constitution of the clock pulse control device 15. It is provided with an AND gate 17 to be driven into binary condition 1 in response to application of the addition command and the judgment output G, an AND gate 18 to be operated in response to application of the subtraction command and the judgment output $\overline{G}$ and an OR gate 19 having the outputs of said both AND gates as its inputs. The output of said OR gate is applied to an inverter 20 and the output of said inverter 20 and a signal $t_4\Phi_1$ from the outside are applied to an OR gate 21. That is, what is controlled by the clock pulse control device 15 is only the clock pulse $\Phi_1$ generated during the duration of the bit timing pulse $t_4$. The output of the OR gate 21 in the last stage is introduced in the clock pulse input of the second decimal point register 61. On the contrary, if the operation result is required to be introduced in the first decimal point register 31, the judging device 16 may be provided in connection with the register 61 and the output of the OR gate 21 in the last stage may be introduced in the register 31.

Referring to FIG. 7-1 representing a logic constitution of the judging device 16, there provided are an OR gate 22 having the addition and subtraction commands as its input and an AND gate 23 having the output of said OR gate and a signal $x_1$ derived in response to a storage of binary 1 in the memory cell corresponding to the least significant bit position of the register as its inputs. The output of said AND gate 23 is supplied to the set input terminal of a flip-flop 24 of RS-type, whose reset input terminal is supplied with the digit timing signal $T_{16}$. In the case of using a flip-flop 25 of D-type, as shown in FIG. 7-2, an operational function similar to the above can be obtained by adding an AND gate 26 having its own output and the digit timing signal $T_{16}$ as its inputs since it has no reset input terminal. That is, in response to incoming of the digit timing signal $T_{16}$, the feedback loop including the AND gate 26 is cut off and a reset condition is obtained.

The writing operation of decimal point information in the decimal point register is carried out in the following manner. Just after starting the operation, the register is once cleared and binary 1 is stored in the position corresponding to the least significant bit $x_1$. Then, the decimal point key is pushed to give a preparation of shift of said binary 1. If the numeral keys are pushed twice after the operation of the decimal point key, said binary 1 should be shifted to the position corresponding to the third bit $x_3$. Therefore, the numerical value to be stored should be changed in accordance with the number of pushings of the numeral keys after the operation of the decimal point key. Thus, if the number of additions of $X+1$ is previously caused to correspond to the number of pushings of the numeral keys following the decimal point key utilizing addition of $X+1$ as shown in FIG. 5-2, the decimal point information is written in the register. According to the above constitution, therefore, conventional adders are no longer required.

Next, the above-mentioned devices will be described in detail referring to an embodiment constituted using MOS type field effect transistors which are advantageous for integration of circuits.

Referring to FIG. 8 representing a practical circuit configuration of the decimal point register 31, MOS field effect transistors are used as the structural elements. The each MOS field effect transistor is utilized as a temporary storage circuit of low power consumption storing an information in its gate internal capacitance as an electrostatic charge, in view of its inherent feature of very high internal capacitance between the gate and the substrate and very high input impedance between the gate and the source The broken line blocks 27 in FIG. 8 are memory cells (D-type flip-flops) corresponding to the respective bits and having the same circuit configuration. For example, the memory cell corresponding to the second bit $x_2$ will be described now. All of the MOS field effect transistors constituting the respective cells are P-channel type.

Two field effect transistors 41 and 42 have inherent stray capacitances between their gate electrodes and substrates and store electrostatic charges corresponding to information pulses to temporarily store the informations. The gate electrodes thereof serve as respective information pulse input terminals, the source electrodes are connected are connected to the ground and the drain electrodes are connected through the undermentioned load resistors to a potential (negative) source 30.

The drain electrode of the fore-stage transistor 41 is connected in cascade through a transistor 44 to the gate electrode of the back-stage transistor 42 and a charge stored in the fore-stage is transferred to the gate internal capacitance of the back-stage with inverted phase. The drain electrode of the back-stage transistor 42 is connected through a transistor 45 to the gate electrode of the fore-stage transistor 41 to provide a feedback path of the informations. Thus the informations can be circulated and stored through the both transistors 41 and 42 and the transistors 44 and 45 constituting the transmission paths between said both transistors.

A transistor 43 switched in response to the clock pulses $\Phi_1$, $\Phi_2$, and $\Phi_3$ having different phases and the above-mentioned transistors 44 and 45, respectively, operate as switching elements. The clock pulses $\Phi_1$, $\Phi_2$, and $\Phi_3$ are introduced in the respective gate electrodes and the source-drain paths are respectively inserted in control lines to be switched. Field effect transistors 46 and 47 connected respectively to the drain electrodes of the transistors 41 and 42 operate as load resistors of the storage elements. The transistor 43 serves as a switching element for controlling information transfer between the bits.

Now, an operation of the above mentioned circuit will be described referring to FIG. 9. Which the memory cell is storing binary 1 or 0 is decided according to either the back-stage storage transistor is conducting or cut off. Now, it it is assumed that the memory cell corresponding to the third bit $x_3$ stores binary 0, that is, the back-stage storage transistor of the memory cell corresponding to the bit $x_3$ is in the cutoff state. In this case, therefore, an output signal of negative potential is derived from said memory cell.

If the clock pulse $\Phi_1$ of negative level is introduced in the gate electrode of the transistor 43, said transistor is turned on and the input signal is transferred to the point A as it is. Since the input signal has a negative level, a negative charge is stored in the gate internal capacitance of the storage transistor 41 and, at the same time, said transistor 41 is driven into conduction. At this time, the drain electrode of the transistor 41 is at zero potential. The input information is conserved by the gate internal capacitance while discharging at a time constant determined by the PN junction leakage resistance and the gate internal capacitance of the switching transistor 44 until the next clock pulse $\Phi_2$ is applied.

When the clock pulse $\Phi_2$ is introduced in the gate electrode of the switching transistor 44, said switching transistor 44 is turned on and a potential at the point B is transferred to the point C as it is. Since the point B was at zero potential, however, no charge is stored in the gate internal capacitance of the storage transistor 42. Therefore, said storage transistor 42 is in the cutoff state and the point D is maintained at a negative potential. Accordingly, the memory cell corresponding to the bit $x_2$ stores binary 0 in this state and the operational state of the fore-stage memory cell has been transferred to the back-stage memory cell in response to introduction of the clock pulses $\Phi_1$ and $\Phi_2$. In the case the fore-stage memory cell corresponding to $x_3$ stores binary 1 contrary to the other memory cells, the memory cell corresponding to $x_2$ turns to the state of 1 similarly.

If the clock pulse $\Phi_3$ is applied thereafter, the feedback path from the back-stage to the fore-stage is closed for the first time and the potential at the point D is returned to the point A and kept temporarily in the gate internal capacitance of the fore-stage. That is, a negative charge is again stored in the gate internal capacitance since the drain terminal of the back-stage was at a negative potential.

After that, if a new information pulse is applied at the time of introduction of the clock pulse $\Phi_1$, a new memory content corresponding to the input information is conserved without connection to the memory content of the fore-stage. In the case of absence of new input information, it is transferred again to the gate internal capacitance of the back-stage in response to introduction of the next clock pulse. Through petition of such operation, the information of one bit is stored statically in appearance. In addition, the gate internal capacitance has its discharging paths at the time of interruption of control pulse through the gate and source electrodes to the ground and through the switching transistor in open circuit to the ground, but these paths exhibit high impedance and block quick dissipation of the information.

The clock pulse $\Phi_1$ controlling information transfer between the bits is controlled by the clock pulse control device 15 only during the duration of the bit timing signal $t_4$. The other clock pulses $\Phi_2$ and $\Phi_3$ are required to be always applied periodically in order to prevent dissipation of information.

FIGS. 10 represent modified embodiments of the memory cell of the decimal point register 31. Referring to FIGS. 10-1 and 10-2, there provided are three storage transistors 51, 52 and 53 and three switching transistors 54, 55, and 56 controlled by two clock pulses $\Phi_1$ and $\Phi_2$. Two clock pulses are sufficient for this case in contrast with the above-mentioned embodiment, but operation of the circuit is quite similar. The transistors 57, 58, and 59 serve as load resistances of the transistors 51, 52, and 53, respectively. The modified embodiment shown in FIG. 10-3 includes two storage transistors 71 and 72 and two switching transistors 73 and 74. Since this embodiment somewhat differs from the memory cells in the above-mentioned embodiments and has no feedback path, it cannot execute an apparently static storage. Transistors 75 and 76 operate as load resistances.

FIG. 11 represents a practical circuit configuration of the clock pulse control device 15 using MOS field effect transistors. An AND gate 17 surrounded by a broken line block is driven for the first time in response to fulfillment of conditions of the judgment output G and the addition command. Transistors 81 and 82 operate as gate elements. The gate electrodes thereof are connected to sources of input conditions, the source electrodes are connected to the ground and the drain electrodes are connected in common through the undermentioned load resistance to a potential (negative) source 30. A transistor 83 operates as an output element. Though the gate circuit thereof itself is well known in the art, some explanations will be added as the under.

In the case the both judgment output G and addition command are at zero potential, the both transistors 81 and 82 do not conduct and the gate electrode of the output transistor 83 is maintained at a negative potential. Therefore, said transistor 83 conducts and the potential of its drain electrode is raised up to nearly zero potential. Thus, the gate output corresponding to binary 1 is derived. Transistors 84 and 85 operates as load resistances. On the other hand, an AND gate 18 operates in response to fulfillment of conditions of the judgment output G and the subtraction command and transistors 91, 92, 93, and 94 which are the structural elements thereof operate in correspondence with the above-mentioned AND gate 17. The drain electrodes of the output transistors 83 and 93 are connected in common to the gate electrode of a transistor 101 in an inverter 20 in the next stage. By use of such connection, the OR gate 19 in the logic constitution of FIG. 6 can be omitted. This is a so-called wired OR gate. A section surrounded by a broken line block in the last stage is an OR gate 21. Transistors 111 and 112 and transistor 113 are respectively operate as gate elements and an output element. It is noted that the clocl pulses $\Phi_1$, $\Phi_2$, and $\Phi_3$ are negative pulses in operation of the OR gate 21.

When the drain electrode of the inverter transistor 101 is at a negative potential, that is, when the conditions of the judgment output G and the addition command or the conditions or the judgment output G and the subtraction command is fulfilled, the gate electrode of the transistor 111 directly coupled thereto becomes the negative potential and the transistor 111 is driven into conduction. On the other hand, since the transistor 112 is also driven into conduction when the clock pulse $\Phi_1$ is generated, the gate electrode of the output transistor 113 led to zero potential. Accordingly, the transistor 113 is cut off and the drain electrode thereof drops down the negative potential. This results in that the clock pulse $\Phi_1$ appears as it is from the drain electrode without interruption. Since the present system is handled as a positive logic system throughout this specification by causing the zero potential to correspond to binary 1 and the negative potential to binary 0, this state corresponds to two input of 0 and an output of 0.

If the condition is not fulfilled and the drain electrode of the inverter transistor 101 becomes zero potential, however, the transistor 111 becomes a cutoff condition and the output transistor 113 inverts into conduction. Therefore, the drain electrode of the transistor 113 is raised up to zero potential and the clock pulse Φ is not derived from the drain electrode in spite that it is generated. This state corresponds to a state wherein one input is 1, the other inputs are 0 and the output is 1, and clearly indicates a function of OR gate. Transistors 102, 114, and 115 serve as load resistances.

FIG. 12 represents a practical circuit configuration of the judging device 16 similarly using MOS field effect transistors. An OR gate 22 surrounded by a broken line block includes a gate transistor 121 having the addition command as an input, a gate transistor 122 having the subtraction command as an input, an output transistor 123 and two transistors 124 and 125 for load resistors, and its operation is quite the same type as the above-mentioned OR gate 35. An AND gate 23 following the OR gate 22 includes a gate transistor 132 having the output of the fore-stage OR gate 22 as an input, a gate transistor 132 having the least significant bit $x_1$ of the decimal point register as an input, an output transistor 133 and two transistors 134 and 135 for load resistances. The output of said AND gate is introduced in a D-type flip-flop 36 for judgment. This flip-flop 36 has a circuit configuration quite the same as that of the memory cell of the register and includes two storage transistors 141 and 142, three switching transistors 143, 144, and 145 and two load resistance transistors 146 and 147. An AND gate 37 includes a gate transistor 151 having the digit timing signal $T_{16}$as an input, a gate transistor 152 having the output of the flip-flop 36 as an input, an output transistor 153 and two load resistance transistors 154 and 155. These gate circuits are all based upon those well known and an operation of the whole judging device should be easily understood from the above description.

Such interruption control of clock pulse deciding a propagation speed of information in the registers for a specific time interval means, in another word, a variable frequency or variable period of clock pulse.

Though such registers of circulation type (so-called dynamic register) using supersonic delay lines have been known in the art, said delay lines have own inherent propagation speeds and the propagation speed of information has been considered to be impossible to change in response to external signals. In a register having MOS field effect transistors as the structural elements as in this invention, however, since the MOS field effect transistors preferably exhibit very high input impedance, its possible storage time extends to several seconds and the frequency of clock pulse can be arbitrarily changes from one kilocycle to several megacycles. The above-described operation device of this invention has been completed based upon a principle of changing the frequency of clock pulse which decides the propagation speed of information for a specific time interval, from an aspect that the frequency of clock pulse can be made variable.

FIG. 13 represents a block diagram of an indication device in which a decimal point indicating section is also included. While the indication tubes to be used may be either of glow discharge type or of fluorescent type, the description will be made in connection with the case of using the latter. The indication tube of fluorescent type is a directly heated cathode ray tube and executes luminescent operation by causing thermions to collide against a plurality of phosphors arranged in a plane. A thermion emitting filament, phosphor anode electrodes arranged based upon character patterns to be indicated and an accelerating and diverging grid electrode arranged therebetween are sealed in a tube envelope. If a suitable voltage is applied to the cathode filament to heat itself in such an indication tube, thermions are emitted toward the phosphors. The thermions are accelerated and diverged by the grid electrode and then uniformly and concentratively collide against only the phosphors on the anode electrodes to which an operation voltage is applied to excite said phosphors. Luminescence control is prepared by making the grid electrode to be at nearly equal potential to the cathode potential (filament potential) to cut off said indication tube. The device in the drawing is base upon a dynamic indication system utilizing such luminescence control using the grid electrode.

For indication of the numeral portion, the digit timing signals $T_2$, $T_3$, . . . $T_{16}$ and $T_1$ are supplied to the grid electrodes of the respective indication tubes 63 from a digit time counter 65 and information signals obtained by decoding the information in a first dynamic register 3 of the numerical processing section in synchronism with the digit timing signals are supplied to the anode electrode from a decoder circuit 64, so that the both signals cooperate in the respective tubes to indicate numerical character patterns.

The information (binary coded decimal number of 16 digits) in the first dynamic register 3 is circulated as being shifted in time through an arithmetic unit 9. However, the arithmetic unit 9 dies not exhibit arithmetic function during the indication cycle since no other input is applied thereto.

Said information in the register is supplied through a buffer register 10 for indication to the decoder circuit 64. The respective digit positions of the information in the first dynamic register 3 appearing at the arithmetic unit 9 are such that the digit timing signal $T_2$ corresponds to the first position (least significant bit position), the digit timing signal $T_3$ corresponds to the second position, . . . , and the digit timing signal $T_1$ corresponds to the 16 position (most significant bit position). The binary information in the register is converted in the decoder circuit 64 into decimal outputs to select the anode segments constituting the respective numeral patterns to be indicated. The bit time counter 66 generates the bit timing pulses $t_1$, $t_2$, $t_3$ and $t_4$.

Since a decimal point register 67 stores a binary 1 in only one memory cell thereof and its bit position always corresponds to the numerical value stored in the register, the time at which the register output 1 appear coincides with said numerical value stored in the register. That is, when the register output appears during the digit timing signal $T_1$, the decimal point register 67 stores a numerical value 0, and, when the register output appears during the digit timing signal $T_3$, it stores a numerical value 2. Accordingly, if the decimal point segments of the respective indication tubes are connected in common, the position of decimal point can be simply indicated without use of the decoder circuit 64, and a driving circuit for decimal point indication can be remarkably simplified. A buffer register 11 is provided for delay by one digit time.

We claim:

1. An operation device comprising registers each composed of cascade-connected memory cells the number of which corresponds to the predetermined number of bits and arranged that one of said memory cells located in a bit position relating to a numerical value to be stored takes an operational state different from those of the other memory cells, shift means connected to said registers for shifting the content of said memory cells taking the operational state different from the others to another memory cell located in another bit position, and shift control means connected to said shift means for deciding said another bit position to which the content of said memory cell taking the operational state different from the others is to be shifted in correspondence with an operand to be supplied for an arithmetic operation with respect to the numerical value already stored in one of said registers each of said memory cells being composed of at least two storage MOS type field effect transistors connected in cascade and arranged to store an information in a capacitor constituted between the gates and the substrates of said MOS type field effect transistors as an electrostatic charge.

2. Decimal point processing apparatus comprising at least two registers with one register storing numerical information and the other register storing information relating to the position of the decimal point in the numerical information stored in said one register, said other register including at least two transistors connected one to the other for storing one bit of said decimal point information, a generator for generating at least one set of timing signals having a time scale corresponding to the weight of the information and determining the boundaries of each word time, decimal point processing means including a plurality of logical gating circuits connected to said generator, connections between said decimal point processing means and said registers, said decimal point processing means modifying the information stored in the decimal point register in accordance with new decimal point information at the termination of each timing period, the modified decimal point information being delivered during a period of one timing signal within each word time, the time scale of the timing signal determining the decimal point position of the resulting information, and time sharing indicating means connected with said generator, the last said means including decimal point indicating elements interconnected one with the other and with said decimal point processing means and actuated by the decimal point information at a period of one timing signal during each work time.

3. Decimal processing apparatus according to claim 2 wherein said transistors are MOS field effect transistors connected in cascade and said one bit of decimal point information is capacitively stored in the capacitor formed between each gate electrode and the substrate of each transistor 4. Decimal point processing apparatus according to claim 2 wherein said time sharing indicating means includes a plurality of numerical indicating means.

5. Decimal point processing apparatus according to claim 2 wherein said decimal point processing means includes means for modifying the information stored in said decimal point register in accordance with the new decimal point information at the termination of each timing period.

6. Decimal point processing apparatus according to claim 5 wherein said decimal point processing means includes means for delivering the modified decimal point information during a period of one timing signal within each word time.